United States Patent [19]

Donnelly

[11] Patent Number: 5,016,964

[45] Date of Patent: May 21, 1991

[54] OPTICAL FIBER COUPLER WITH LINEAR INPUT

[75] Inventor: Michael B. Donnelly, Colorado Springs, Colo.

[73] Assignee: Spectranetics Corporation, Colorado Springs, Colo.

[21] Appl. No.: 417,245

[22] Filed: Oct. 4, 1989

[51] Int. Cl.[5] ............................................. G02B 6/32
[52] U.S. Cl. .............................. 350/96.18; 350/96.25
[58] Field of Search ........................... 350/96.18, 96.25

[56] References Cited

U.S. PATENT DOCUMENTS 4,913,142  6/1990  Kittrell ................................. 606/7

*Primary Examiner*—John D. Lee
*Assistant Examiner*—Phan T. Heartney
*Attorney, Agent, or Firm*—Cushman, Darby & Cushman

[57] ABSTRACT

An apparatus to couple a laser beam into a plurality of optical fibers is disclosed. The laser beam, having a naturally rectangular cross sectional area, is passed through a cylindrical lens to focus the laser beam into a focal line. The optical fibers are then arranged in a linear configuration at the focal line to accept the laser beam. A second cylindrical lens may be used to control the length of the focal line to match the length of the linearly configured optical fibers. A method for coupling the laser beam into the linearly configured optical fibers is also disclosed.

17 Claims, 2 Drawing Sheets

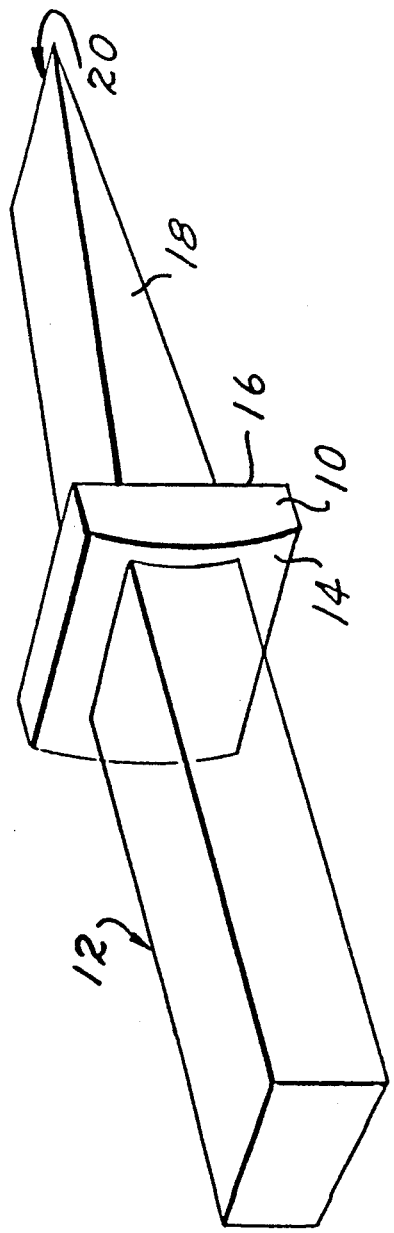
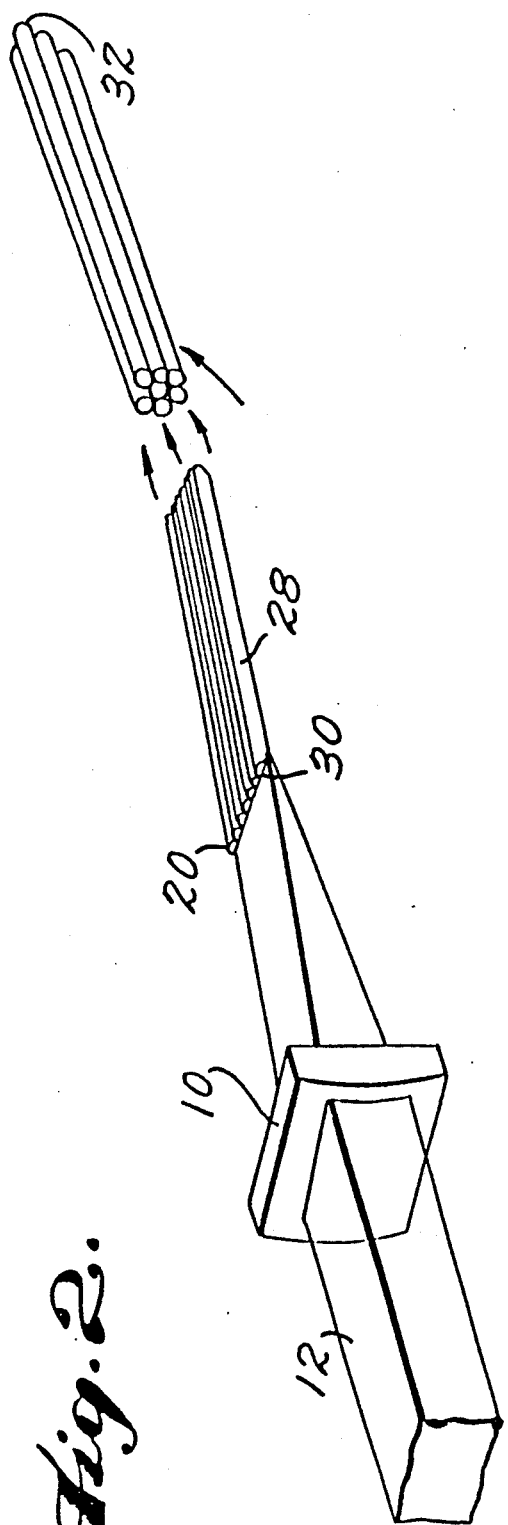

OPTICAL FIBER COUPLER WITH LINEAR INPUT

BACKGROUND OF THE INVENTION

1. Field of the Invention

This invention relates to optical couplers. More particularly, this invention relates to cylindrical lenses to couple laser energy into linearly configured optical fibers.

2. Description of the Related Art

Prior apparatus for coupling laser energy into a bundle of optical fibers utilized one or more lenses to sharply focus the laser energy into a focal point. The bundle was arranged with input ends of the fibers in a circular or hexagonal pattern. The circularly arranged fiber ends were placed within the laser beam at a distance from the focal point such that the cross sectional diameter of the laser beam substantially matched the diameter of the circular pattern of optical fibers This arrangement, however, suffers from at least two distinct problems. First, the coupling system produced an unevenly distributed laser energy profile at the incident ends of the optical fibers such that the respective optical fibers transmitted the energy in nonuniform amounts. In particular, launching a Gaussian laser beam into a circular or hexagonally shaped optical fiber bundle will result in the fibers nearer the center of the circular or hexagonal configuration transmitting greater amounts of energy than the fibers nearer the periphery of the circular or hexagonal configuration. Second, the naturally rectangular shape of the laser beam exiting the laser was not conducive to "rounding" into the circular or hexagonal configuration of the optical fibers without significant energy loss.

These problems of uneven energy distribution in the transmission fibers and uncoordinated beam shapes between the laser and the fibers resulted in inefficient energy coupling between the laser and the optical fibers.

The problem of uneven distribution of laser energy within the respective optical fibers causes the total power transmission capability to be dictated by the peak power rating of the central fibers, which will be carrying the most energy. Thus, the total power coupled into the fibers must be decreased to bring the maximum power coupled into the individual central fibers to within their energy damage thresholds. Meanwhile, the peripheral fibers receiving the lower energy concentration are not being used to their peak energy transmission ability due to the caution which must be observed in preventing destruction of the central fibers in the higher energy concentration region. Therefore, to prevent damage to the central fibers, total coupled energy must be reduced even though the peripheral fibers are not used to their peak energy transmission ability.

Several remedies to the problem of uneven energy distribution in the optical fiber configuration have been implemented. Known methods to more uniformly distribute the beam energy along the entire optical fiber profile include using beam homogenizers, aspheric lenses, or afocal doublets. The beam homogenizer folds back the side lobes of an incident laser beam onto the central portion of the beam to create a homogenized beam of more uniform intensity across its energy profile. One known method of homogenizing an energy beam is by using symmetrical mirror pairs located along the axis of the beam. The first set of mirrors separates the sides lobes of the beam from the center of the beam and the second set of mirrors folds the beam, imaging each side lobe to the opposite side of the central axis from where it originated. The resultant superimposed beam is more uniformly distributed across the profile than the original beam profile.

Other known methods of unifying the beam profile include the use of aspheric lenses. An aspheric plate, usually having a conic surface of revolution about the lens axis, deviates an incoming laser beam so the intensity of the beam becomes uniform across the beam profile. A second plate then deviates the waves to eliminate spherical aberration without modifying the uniformly distributed energy profile. The result is an unaberrated, substantially uniformly distributed laser energy profile to be coupled into the circular or hexagonal optical fiber configuration.

Afocal doublets are also employed in known methods of unifying the energy distribution of a laser beam. A doublet is a lens comprising closely spaced positive and negative elements. In the typical arrangement, the lenses are bent to introduce a large amount of spherical aberration. The laser beam is then passed through the first element, with the paraxial rays being essentially unaffected by the spherical aberration while the other rays will see a large amount of uncorrected spherical aberration. Thus, the paraxial rays will remain collimated in the space between the first and second elements while the peripheral rays seeing the spherical aberration will converge in the space between the lenses. By the time the rays meet the second lens, the peripheral rays have bunched together as they converge such that the energy at the periphery of the energy profile is increased. Meanwhile, the centrally located rays have remained collimated such that the energy at the central region of the energy profile is unchanged. The second element has an equal and opposite spherical aberration as the first element to recollimate the energy beam to result in a collimated and substantially uniformly distributed laser beam.

The above methods of alleviating the nonuniformity in the laser energy profile before coupling the laser beam into an optical fiber configuration require no fewer than four elements and also require custom design and custom manufacturing for the particular laser wavelength, energy level, and beam size used. Design and manufacturing costs can be prohibitively high despite the benefits of increased total power coupling capability when the above methods are used to unify the laser energy profile. Accordingly, a simplified coupling system is needed which creates a more uniform laser energy profile using standard optical components and equipment rather than custom components and equipment.

The further problem of manipulating the naturally rectangularly shaped laser energy beam into a circular or hexagonally shaped beam to accommodate the circular or hexagonal optical fiber configuration is not necessarily remedied by the above energy distribution methods. One known method of adjusting the shape of the laser beam to match the circular or hexagonal optical fiber configuration is to pass the naturally rectangular laser beam through a spatial filter prior to encountering the optical fiber ends. The spatial filter will round the laser beam by blocking the outer portions of the rectangular beam, unfortunately resulting in a significant amount of energy loss before the laser beam even encounters the optical fiber ends.

Accordingly, a coupling system is needed which efficiently matches the shape of the laser beam with the shape of the optical fiber configuration.

SUMMARY OF THE INVENTION

The preferred embodiment of the present invention provides a laser beam passing through a cylindrical lens to couple the laser beam into a linearly configured optical fiber bundle. The cylindrical lens converges the laser beam into a focal line which is then coupled into the linearly configured optical fibers. The object of this arrangement is to provide a substantially uniform distribution of energy into the respective optical fibers and to conform the shape of the optical fibers to the shape of the laser beam without significant energy loss.

In accordance with another embodiment of the present invention, the ends of the optical fibers are placed at a location between the cylindrical lens and the focal line where the width of the laser beam is equal to the core diameter of the optical fibers.

In accordance with another embodiment of the present invention, two cylindrical lenses are placed along the optical axis with one cylindrical lens having an axis parallel to the optical fiber linear configuration and the second cylindrical lens having an axis perpendicular to the optical fiber linear configuration. In this system, the length of the focal line may be controlled to match the length of the optical fiber linear configuration by adjusting the distance between the two respective cylindrical lenses.

BRIEF DESCRIPTION OF THE DRAWINGS

In accordance with these and other objects which will be apparent to those skilled in the art, the present invention will be described with particular reference to the accompanying drawings, in which:

FIG. 1 is a perspective view of a laser beam passing through a cylindrical lens;

FIG. 2 is a perspective view of a coupling system according to a first embodiment of the present invention;

DETAILED DESCRIPTION OF THE PRESENTLY PREFERRED EMBODIMENTS

Figure 3:
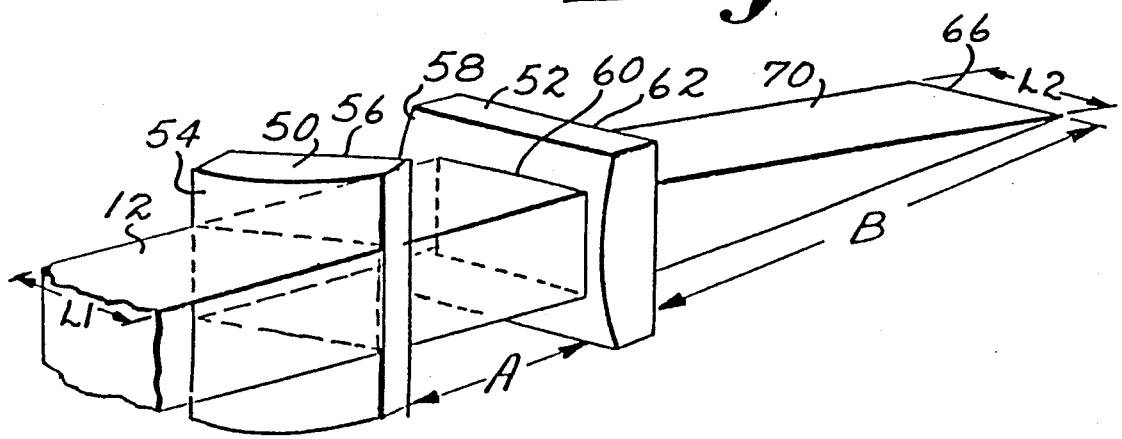
FIG. 3 is a perspective view of a coupling system according to a second embodiment of the present invention.

FIG. 1 illustrates the effect of a cylindrical lens 10 on a laser beam 12. A laser (not shown) projects the laser beam 12 toward the incident surface 14 of the cylindrical lens 10. The laser beam 12 has a naturally rectangular shape before encountering the lens 10, as illustrated in FIG. 1. As the laser beam exits the distal surface 16 of the cylindrical lens 10, the exiting beam 18 is converging toward a focal line 20.

The incident surface 14 may be convex toward the laser and the distal surface 16 may be flat to realize the focal line 20 desired for the preferred embodiment of the present invention.

As illustrated in FIG. 1, the cylindrical lens 10 focuses the laser energy 12 along only one axis, thus forming a focal line image 20 of the incident laser beam 12 rather than a focal point. The preferred cylindrical lens is plano-convex with an anti-reflective coating. The lens has high transmission at the operating laser wavelength and includes a clear aperture larger than the cross sectional area of the laser beam.

As an alternative lens configuration, the incident surface may be flat and the distal surface concave to realize the focal line 20. Still further lens embodiments capable of forming a focal line will be known to those of ordinary skill in the art.

FIG. 2 illustrates an embodiment of the coupling system of the present invention using a cylindrical lens illustrated in FIG. 1. Once the laser beam 12 passes through the cylindrical lens 10 and is converged into the focal line 20, the beam is coupled into an optical fiber bundle 28. The fiber bundle 28 is a plurality of optical fibers, each having an proximal end 30 and a distal end 32. The proximal ends of the optical fibers are arranged in a linear configuration, as shown in FIG. 2 and are disposed at or near the focal line 20 of the laser beam 12. The length of the linearly configured optical fibers should approximate the length of the focal line to allow maximum energy coupling with uniform energy distribution throughout the respective fibers. The optical fibers 28 may then be maneuvered from the linear configuration at their proximal end 30 to a circular, hexagonal, or other pattern at their distal end 32 for convenient handling.

The preferred optical fibers 28 are multimode, step index fibers composed of silica. The fibers may have less than or equal to a 1.1 cladding/core ratio. A large numerical aperture and low attenuation at the operating laser wavelength are desirable. A cylindrical lens with as short a focal length as possible to match the numerical aperture of the fiber is desirable to guarantee maximum acceptance of the laser energy into the optical fiber.

Since the cylindrical lens does not converge the laser energy into a sharp focal point, fluence levels at the incident end of the optical fibers are more uniform along the length of the focal line. The typical laser energy profile includes a "top-hat" or "flat-top" energy profile along the vertical axis of the laser beam (corresponding to the longest side dimension of the beam cross section) and a gaussian energy profile along the horizontal axis of the laser beam (corresponding to the shorter side dimension of the beam cross section). The cylindrical lens converges the laser beam about the horizontal axis but does not converge the laser beam about the vertical axis, thus resulting in the focal line of the present embodiment. The effect of the linear focusing by the cylindrical lens is a retention of the original "top hat" energy profile at the length of the focal line and a consolidation of the original Gaussian profile at the width of the focal line, creating a more uniform total energy profile at the incident ends of the optical fibers than both the original laser energy profile and a prior energy profile of a circularly focused beam.

FIG. 3 illustrates another embodiment of the present invention. In this embodiment, the laser beam 12 is launched through a first cylindrical lens 50 and a second cylindrical lens 52. The cylindrical lenses 50 and 52 may have the same features and characteristics of the cylindrical lens described in the above embodiments. The laser beam 12 encounters a first incident surface 54 of the first lens 50 and exits a first distal surface 56 of the first lens 50. The incident surface 54 and distal surface 56 may have the same structural relationships described in the above embodiments to converge the laser beam 12 into a focal line even though the first lens 50 is placed to produce a focal line perpendicular to the longer previous embodiments is placed to produce a focal dimension of the beam while the lens 10 of the line parallel with the longer dimension of the beam. As shown in FIG. 3, the first lens 50 may have a first incident surface 54 uniformly convex toward the laser in the longitudinal direction of the lens 50. As used throughout, the longitudinal direction of the lens 50 refers to the direction about which the incident surface 54 of the lens 50 is curved, or, in other words, in the direction from the top of FIG. 3 to the bottom of FIG. 3.

The first cylindrical lens 50 narrows the length, L1, of the laser beam 12. As used throughout, the longitudinal direction of the lens 52 refers to the direction about which the incident surface 58 of the lens 52 is curved, or, in other words, in the direction through the page of FIG. 3. The laser beam 12, converging lengthwise as a result of first cylindrical lens 50, crosses the second incident surface 58 and exits the second distal surface 62 of the second cylindrical lens 52 to converge the narrowing laser beam 60 into a focal line 66 having a length, L2, narrower than the length of the original laser beam, L1.

The focal length of the first cylindrical lens 50 should be at least twice the focal length of the second cylindrical lens 52.

The length L2 of the focal line 66 may be adjusted by adjusting the distance, A, between the first cylindrical lens 50 and the second cylindrical lens 52. Alternatively, the first cylindrical lens may be modified to have a concave first incident surface 54 to expand the length L2 of the focal line 66 to greater than the length L1 of the original laser beam 12. The opportunity to expand and contract the length L2 of the focal line 66 allows the optical coupler of FIG. 3 to adjust the focal line 66 to the size and number of optical fibers 28 which are to accept the laser energy. For example, if a number of optical fibers 28 are linearly configured at their proximal ends 30 to a resultant length, the length of the linearly focused beam would be adjusted to match the resultant length of the optical fiber as follows. First, the proximal ends 30 would be located at the distance B of FIG. 3 where the second cylindrical lens 52 focuses the beam 60 into a focal line. Then, the first cylindrical lens 50 would be moved relative to the second cylindrical lens 52 a distance A from the second cylindrical lens 52 until the length L2 of the focal line 66 matches the resultant length of the proximal ends 30 of the optical fibers 28. With this tuned arrangement, substantially all laser energy will encounter the proximal ends of the optical fiber bundle and all respective optical fibers will be used substantially equally to transport some laser energy, resulting in less waste, increased energy coupling efficiency, and reduced risk of fiber damage.

Figure 4:
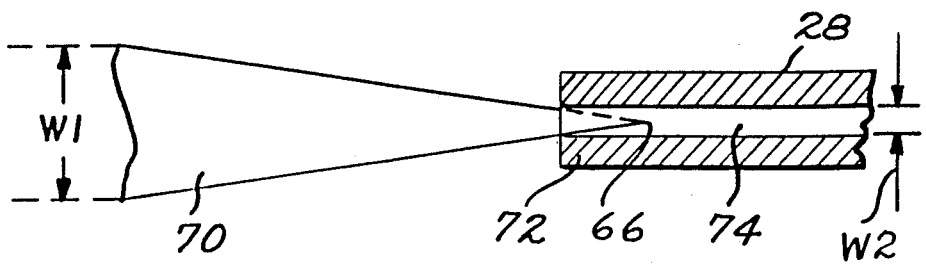
FIG. 4 is a cross sectional view of a focused beam coupled into an optical fiber bundle according to a third embodiment of the present invention.

FIG. 4 illustrates still another embodiment of the present invention and may be employed to improve any of the above described embodiments including the embodiment of FIG. 3 as more particularly described below. According to the embodiment of FIG. 4, the converging laser beam 70 is characterized by a cross sectional width, W1, which varies along the distance B between the second distal surface 62 of the second cylindrical lens 52 and the focal line 66. At the second distal surface, the cross sectional width W1 is substantially equal to the width of the original laser beam 12 and at the focal line 66, the width W1 is substantially equal to zero.

The optical fibers 28 include a cladding 72 surrounding a core 74. The core is generally circular in cross section and may be characterized by a cross sectional area of diameter W2. In the embodiment of FIG. 4, the optical fibers are positioned slightly closer to the second cylindrical lens than the focal line 66 such that the diameters W2 of the cores 74 of the optical fibers are substantially equal to the variable width W1 of the converging beam 70. With the arrangement of FIG. 4 in the system of FIG. 3, the size and shape of the laser energy beam may be adjusted to spatially fit into the linearly configured optical fiber cores, thereby increasing the coupling efficiency of the embodiment over prior couplers.

While the applicant has described the invention has been described in what the applicant considers the most practical, preferred embodiments, the applicant does not limit the invention to the disclosed embodiment but, on the contrary, intends the invention to cover various modifications and equivalent arrangements included within the spirit and scope of the appended claims.

What is claimed is:

1. A laser transmission system, comprising:
   lens means for focusing a laser beam to a focused line;
   means for projecting a laser beam through the lens means;
   a plurality of optical fibers, each fiber having a proximal end, the proximal ends being arranged in linear configuration to accept the focused line.

2. A system according to claim 1, wherein the lens means is a cylindrical lens.

3. A system according to claim 2, wherein the cylindrical lens is a plano-convex cylindrical lens having a curved surface facing the projecting means and having a planar surface facing the proximal ends.

4. A system according to claim 1, wherein the focused line has a focal line length and the linear configuration has an optical fiber length, the focal line length and the optical fiber length being substantially equal 5. A system according to claim wherein the optical fibers each have a distal end, the distal ends being configured in other than a linear configuration.

6. A system according to claim 5, wherein the distal ends are configured in a circular pattern.

7. A laser transmission system, comprising:
   first lens means for focusing a laser beam to a focused line having a focused line length;
   second lens means for controlling the focused line length;
   means for projecting a laser beam through the first and second lens means;
   a plurality of optical fibers, each fiber having a proximal end, the proximal ends being arranged in linear configuration to accept the focused line.

8. A system according to claim 7, wherein the first lens means is a first cylindrical lens having an axis of curvature substantially parallel to the optical fiber linear configuration.

9. A system according to claim 8, wherein the second lens means is a second cylindrical lens having an axis of curvature substantially perpendicular to the optical fiber linear configuration.

10. A system according to claim 9, wherein the first cylindrical lens has a first focal length and the second lens has a second focal length, the focal length being at least twice the second focal length.

11. A system according to claim 9, wherein the first and second lenses include an anti-reflection coating.

12. A system according to claim 7, wherein:
    the optical fibers have a core diameter; and the laser beam has a varying width from the first lens means to the focused line, the linear configuration of optical fibers being placed along the laser beam at a location where the width of the laser beam is substantially equal to the core diameter of the optical fibers.

13. A system according to claim 7, wherein the optical fibers are each multimode, step index fibers.

14. A system according to claim 7, wherein the optical fibers include a cladding to core ratio of less than or equal to 1.1.

15. A method of coupling a collimated beam into an optical fiber bundle, including the steps of:

focusing a laser beam through a cylindrical lens into a focal line;

arranging a plurality of optical fibers into a linear configuration; and launching the focal line into the linear configuration.

16. A method according to claim 15, further including the step, after the step of arranging, of adjusting the length of the focal line to substantially equal the length of the linear configuration.

17. A method according to claim 15, further including the step, after the step of arranging, of placing the optical fibers, having core diameters, at a location where the width of the focal line is substantially equal to the core diameters.

* * * * *